May 31, 1949.  M. E. GLUHAREFF  2,471,681
STOP FOR HELICOPTER BLADES
Filed July 24, 1944
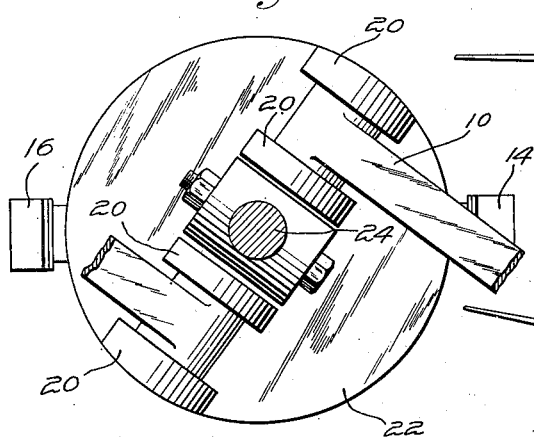
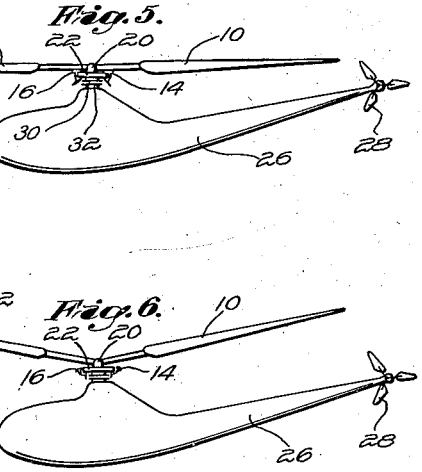
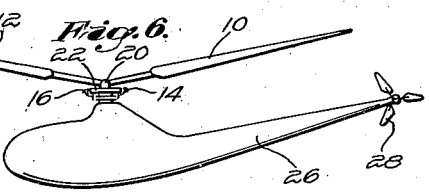
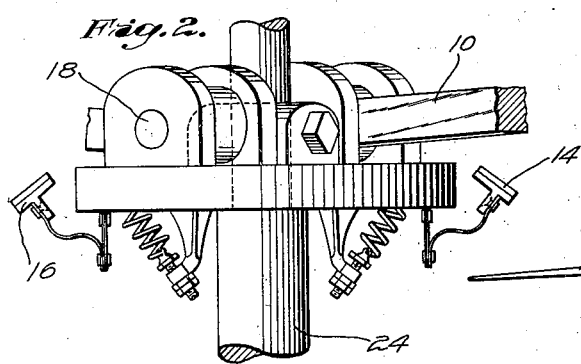
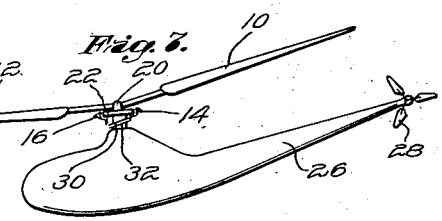
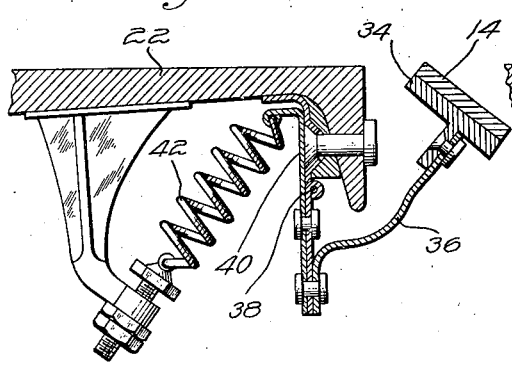
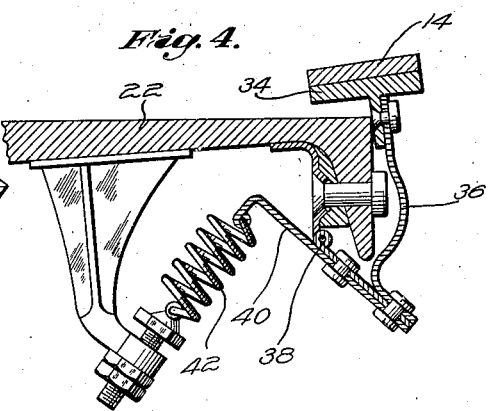
INVENTOR
Michael E. Gluhareff
BY Harris G. Luther
Attorney

Patented May 31, 1949

2,471,681

UNITED STATES PATENT OFFICE 2,471,681

STOP FOR HELICOPTER BLADES

Michael E. Gluhareff, Stratford, Conn., assignor to United Aircraft Corporation, East Hartford, Conn., a corporation of Delaware Application July 24, 1944, Serial No. 546,299

4 Claims. (Cl. 170—160.55)

This invention relates to helicopters and more particularly to stops for helicopter rotor blades.

An object of this invention is to provide structure which will prevent helicopter rotor blades from drooping beyond a predetermined point when the rotor is stationary or slowly rotating, but will permit the blades to droop beyond that predetermined point when they are rotating at operating speed.

Another object is to provide automatically actuated stops for limiting the downward movement of helicopter rotor blades.

Another object resides in the provision of blade motion limiting means which are disabled at a predetermined rotor speed.

Other objects and advantages will be apparent from the specification and claims and from the accompanying drawing which illustrates what is now considered to be a preferred embodiment of the invention.

In the drawing, Fig. 1 is a schematic view partly in section of a portion of a rotor head.

Fig. 2 is a side elevation of the structure shown in Fig. 1.

Fig. 3 is an enlarged detail sectional view showing the stop in inoperative position.

Fig. 4 is a view similar to Fig. 3 but showing the stop in operative position.

Fig. 5 is a schematic side elevation of a helicopter showing the stops in operative position.

Fig. 6 is a schematic side elevation showing the stops in inoperative position, and Fig. 7 is a schematic side elevation illustrating the additional movement of the rotor blades with the stops in inoperative position.

The blades of a helicopter rotor are usually made quite flexible and indeed flexible enough so that they will bend under their own weight while stationary or while rotating at a comparatively slow speed. The lower position of the blade tips must be high enough so that the blades will clear the helicopter fuselage by a safe margin when first starting to rotate. The downward motion of the rotor blades is, therefore, limited by stops arranged adjacent the rotor hub and which determine the lower position of the blades.

As the speed of the rotor increases, the aerodynamic lift on the blades, which is quite pronounced on the outer half of the blade, lifts the blades off their stops and also reduces materially the deflection in the blades. Centrifugal force acting lengthwise of the blades also tends to straighten the blades so that while rotating at operating speed, the blades do not have the deflection which was present when they were stationary or rotating slowly.

During operation of the helicopter, and particularly when the rotor blades are subjected to cyclical pitch control which causes the axis of the rotor cone to take a position at an angle with respect to the axis about which the rotor shaft rotates, the blades may oscillate so far about their flapping hinges that they will bump against the stops, thus subjecting the blades to severe bending moments. As pointed out above, the blades are not subject to the same deflection while operating as they had when stationary so that when operating the blades could be allowed to assume a position lower than the lowest permissible position while stationary and still provide a satisfactory safe clearance above the fuselage. I have, therefore, devised a set of stops which will limit the lower position of the rotor blades while stationary, but which are rendered inoperative at operating speeds of the rotor and will then permit the rotor blades to assume a permitted lower position.

In the drawing, Fig. 5 shows the rotor blades 10 and 12 in a normal position and stationary and with the stops 14 and 16 limiting their downward movement. The blades 10 and 12 are mounted for flapping movement on hinges 18 mounted in bosses 20 carried by a support 22. Support 22 is fixed on the upper end of a vertically arranged rotor shaft 24 which extends downwards into the helicopter body 26 to be driven in the usual manner by an engine carried by body 26. An auxiliary rotor 28 is mounted on the tail of body 26 to balance torque reaction and provide steering control.

Cyclical pitch control of the rotor blades is provided in a well known manner by a wobble plate comprising rotatable and stationary plates schematically represented by numerals 30 and 32, respectively. As shown in Fig. 7, wobble plates 30 and 32 have been tilted to change the relation between the cone formed by the rotation of the blades and the rotor shaft or helicopter body in order to give the helicopter forward motion. From this figure, it will be noticed that the stops 14 and 16 have been removed from between the blades 10 and 12 and the support 22 so that blade 12 may have a greater movement without hitting the stop.

Referring now to Figs. 1 to 4, it will be noticed that each stop comprises a block 34 carried by a resilient arm 36 which, in turn, is mounted on a pivot 38 supported by support 22. An arm 40 extends beyond hinge 38 and connects with one end of a tension spring 42, the other end of which is adjustably secured to support 22. Spring 42 urges block 34 into operative position between the support 22 and the associated blade. Taking blade 10 as an example, spring 42 urges block 34 of stop 14 into a position between blade 10 and support 22, thus permitting the support 22 coacting with the stop 14 to cooperate in limiting the downward movement of the blade. It will be obvious from Fig. 4 that as the blade descends into engagement with the top of stop 14, the stop will be depressed until its block 34 abuts against support 22, thus movement of the stop being permitted by the yielding of resilient arm 36.

The weight of the stop 14 and the strength of the spring 42 and their relative positions with respect to the pivot 38 are so arranged that, at a predetermined speed higher than the normal idling speed of the rotor but less than the normal operating speed of the rotor, the centrifugal force acting on stop 14 will balance the force exerted by the spring 42.

At any speed above this predetermined speed, block 14 will be forced outwardly by the action of centrifugal force and thus be removed from its operative position. When stop 14 has been removed, blade 10 is then limited in its downward movement only by the upper surface of support 22, hence the blade is given an additional freedom of movement which is sufficient to prevent the blade from bumping against its limiting means during any normal maneuver, but is still provided with a stop or limiting means which will assure a safe clearance between the blade and the helicopter body during operation.

It is to be understood that the invention is not limited to the specific embodiment herein illustrated and described, but may be used in other ways without departure from its spirit as defined by the following claims.

I claim:

1. A helicopter rotor comprising, a drive shaft, a hub mounted on said shaft having an outstanding blade support, a rotor blade pivotally mounted on said hub for flapping movement and engageable with said support for limiting the downward flapping movement of said blade, and means operative below a predetermined speed of rotation of said blade for limiting the downward flapping movement of said blade in its movement toward said support including a stop supporting member pivoted to said support, a resilient arm carried by said member having a blade stop at its free end, and spring means constantly biasing said member in a direction to swing said stop into an operative position between said support and said blade in which said stop is moved by said blade into abutting engagement with said blade support as said blade flaps downwardly towards the latter.

2. A helicopter rotor comprising, a drive shaft, a hub on said drive shaft, a rotor blade pivotally mounted on said hub for flapping movement, said hub having an outwardly extended portion terminating in a blade support against which said blade abuts upon downward flapping movement, and means for stopping said blade at a point above said blade support when the blade is rotating below a predetermined speed and when said blade is at rest comprising a stop supporting member pivoted on said support and swingable in a generally radial plane relative to said drive shaft, a resilient arm carried by said member, a blade stop on the free end of said arm, and spring means constantly biasing said stop supporting member and stop into an operative position of the latter between said blade and said blade support in which said blade as it flaps downwardly engages said stop and moves the latter against said blade support.

3. A helicopter rotor comprising, a drive shaft, a hub on said shaft, a support outstanding from said hub having a depending portion, a rotor blade pivotally mounted on said hub for flapping movement, said blade being limited in its downward flapping movement by said support, means for arresting the downward flapping movement of said blade at a point above said support when the speed of rotation of said blade is below a predetermined minimum including a stop supporting member pivoted intermediate its ends on said depending portion for swinging movement substantially in a radial plane relative to said shaft, a resilient arm secured to said member on one side of said pivot carrying a blade stop at its free end which is adapted to swing between an operative position in which it overlies said support beneath said blade and an inoperative position in which it lies beyond the reach of said blade when the latter is arrested by said support, and spring means connected at one of its ends to said member on the other side of said pivot and at its other end to said hub for constantly biasing said member and said stop into said operative position of the latter.

4. A helicopter rotor comprising, a drive shaft, a hub on said shaft, a support outstanding from said hub having a depending portion, a rotor blade pivotally mounted on said hub for flapping movement, said blade being limited in its downward flapping movement by said support, means for arresting the downward flapping movement of said blade at a point above said support when the speed of rotation of said blade is below a predetermined minimum including a stop supporting member pivoted intermediate its ends on said depending portion for swinging movement substantially in a radial plane relative to said shaft, a resilient arm secured to said member on one side of said pivot, a blade stop at the free end of said arm adapted to swing between an operative position in which it overlies said support beneath said blade and an inoperative position in which it lies beyond the reach of said blade when the latter is arrested by said support, spring means connected at one of its ends to said member on the other side of said pivot and at its other end to said hub for constantly biasing said member and said stop into said operative position of the latter, and means for determining the inoperative position of said stop including an abutment on said support adapted to engage the spring connected end of said member and limit the radial swinging movement thereof under the action of centrifugal force.

MICHAEL E. GLUHAREFF.

REFERENCES CITED

The following references are of record in the file of this patent:

UNITED STATES PATENTS

| Number | Name | Date |
| --- | --- | --- |
| 1,999,136 | Cierva | Apr. 23, 1935 |
| 2,102,028 | Prewitt | Dec. 14, 1937 |
| 2,151,215 | Larsen | Mar. 21, 1939 |
| 2,153,610 | Campbell | Apr. 11, 1939 |
| 2,396,038 | Bossi | Mar. 5, 1946 |
| 2,405,777 | Buivid | Aug. 13, 1946 |

FOREIGN PATENTS

| Number | Country | Date |
| --- | --- | --- |
| 293,932 | Great Britain | July 19, 1928 |